United States Patent
Wong et al.

(10) Patent No.: US 7,194,006 B2
(45) Date of Patent: Mar. 20, 2007

(54) DIRECTED MAXIMUM RATIO COMBINING METHODS AND SYSTEMS FOR HIGH DATA RATE TRAFFIC

(75) Inventors: Piu B. Wong, Monte Sereno, CA (US); Shimon B. Scherzer, Sunnyvale, CA (US)

(73) Assignee: Kathrein-Werke KG, Rosenheim (DE)

( * ) Notice: Subject to any disclaimer, the term of this patent is extended or adjusted under 35 U.S.C. 154(b) by 1263 days.

(21) Appl. No.: 09/874,932

(22) Filed: Jun. 5, 2001

(65) Prior Publication Data

US 2003/0002490 A1 Jan. 2, 2003

Related U.S. Application Data

(60) Provisional application No. 60/237,951, filed on Oct. 3, 2000, provisional application No. 60/218,905, filed on Jul. 18, 2000.

(51) Int. Cl.
*H04J 4/00* (2006.01)
(52) U.S. Cl. .................. 370/436; 370/441
(58) Field of Classification Search ............. None
See application file for complete search history.

(56) References Cited

U.S. PATENT DOCUMENTS

| | | | |
|---|---|---|---|
| H374 H * | 11/1987 | Abo-Zena et al. .......... 342/378 |
| 5,396,516 A * | 3/1995 | Padovani et al. .......... 375/225 |
| 5,574,984 A * | 11/1996 | Reed et al. ............... 455/69 |
| 5,637,199 A * | 6/1997 | Lorentz et al. .......... 204/192.1 |
| 5,729,557 A * | 3/1998 | Gardner et al. ............. 714/774 |
| 5,974,327 A * | 10/1999 | Agrawal et al. .......... 455/452.2 |
| 6,016,080 A * | 1/2000 | Zuta et al. .................. 331/25 |
| 6,018,528 A * | 1/2000 | Gitlin et al. ................ 370/436 |
| 6,064,662 A | 5/2000 | Gitlin et al. |
| 6,175,550 B1 * | 1/2001 | van Nee ..................... 370/206 |
| 6,327,254 B1 * | 12/2001 | Chuah ........................ 370/328 |
| 6,421,334 B1 * | 7/2002 | Baines ....................... 370/342 |
| 6,603,748 B1 * | 8/2003 | Lu et al. .................... 370/329 |
| 6,697,375 B1 * | 2/2004 | Meng ........................ 370/465 |
| 6,928,268 B1 * | 8/2005 | Kroner ....................... 455/69 |

FOREIGN PATENT DOCUMENTS

EP 0 915 592 A1 5/1999

* cited by examiner

*Primary Examiner*—Doris H. To
*Assistant Examiner*—Phuongchau Ba Nguyen
(74) *Attorney, Agent, or Firm*—Fulbright & Jaworski LLP

(57) ABSTRACT

Methods are provided for choosing mobile stations that have low cross correlations between their array response vectors, thereby minimizing inter-cell interference through uneven average reverse link data rates experienced by the mobile stations and minimizing intra-cell interference without explicit implementation of an interference cancellation algorithm, thereby maximizing the reverse link data throughput of a wireless communication system. Selected mobile stations of one or more are transmitted simultaneously to a base station.

8 Claims, 5 Drawing Sheets

DIRECTED MAXIMUM RATIO COMBINING METHODS AND SYSTEMS FOR HIGH DATA RATE TRAFFIC

RELATED APPLICATIONS

The present application claims priority to U.S. provisional patent application Ser. No. 60/218,905 entitled "Directed Maximum Ratio Combining Methods for High Data Rate Traffic," filed Jul. 18, 2000, the disclosure of which is hereby incorporated herein by reference. The present application is related to co-pending and commonly assigned U.S. patent application Ser. No. 08/929,638, now U.S. Pat. No. 6,108,565, entitled "Practical Space-Time Radio Method for CDMA Communication Capacity Enhancement," filed Sep. 15, 1997, and Ser. No. 09/229,482 entitled "Practical Space-Time Radio Method for CDMA Communication Capacity Enhancement," filed Jan. 13, 1999, the disclosures of which are hereby incorporated herein by reference. The present application is related to co-pending and commonly assigned U.S. provisional patent application Ser. No. 60/237,951 entitled "Implementation of DMRC and Scheduling of High Rate Transmission for Uplink of CDMA Data Network," filed Oct. 3, 2000, and concurrently filed and commonly assigned U.S. patent application Ser. No. [47586-P052US-10103484] entitled "Directed Maximum Ratio Combining and Scheduling of High Rate Transmission for Data Networks," the disclosures of which are hereby incorporated herein by reference.

TECHNICAL FIELD

The present invention relates to, and finds utility within, wireless information communications systems and, more particularly, providing increased data rates in a wireless communication system through use of techniques to reduce interference.

BACKGROUND

High-speed digital data transfers via the so called "Internet" have become ubiquitous in modem society. At the same time, the world has experienced an explosion in wireless communications technology. In well-developed countries like the United States, wireless communications, particularly cellular telephone services, have proliferated as an adjunct to the wired communication network backbone. In less developed countries, wireless communication service is being developed as a primary communications medium. A need has arisen to provide digital data wireless service at ever increasing effective data rates.

Wireless radio telecommunications systems enable many mobile stations or subscribers to connect to land-based wire-line telephone systems and/or digital Internet service providers enabling access to the World Wide Web digital information backbone. Conventional wireless air-interfaces include frequency division multiple access (FDMA), time division multiple access (TDMA), and code division multiple access (CDMA), and improvements therein.

Transfer of digital data packets differs from the transfer of digital voice information. Full duplex (simultaneous two-way) voice communication patterns imply that the data transferred between the base station and a particular mobile are real-time and substantially equal in bandwidth. It has been noted that a total delay of 200 msec (about 2 Kbit of digital data for most speech vocoders) represents intolerable latency within a voice channel. On the other hand, for high speed data packet transfers, mobile stations appear to be far more tolerant of data transfer latencies or delays, with latencies of up to 10 seconds being encountered in current wireless data systems. While such delays appear to be tolerated by the mobile station, the delays, attributable to relatively low effective data transfer rates, are nonetheless undesirable.

Adaptive antenna array technologies used in attempting to optimize data throughput are known. Examples of spatial diversity multiple access methods employing adaptive antenna arrays are described in U.S. Pat. Nos. 5,471,647 and 5,634,199 to Gerlach et al.; an article by M. C. Wells, entitled: "Increasing the capacity of GSM cellular radio using adaptive antennas", *IKE (UK) Proc. on Comm.* Vol. 143, No. 5, October 1996, pp. 304–310; and an article by S. Anderson, B. Hagerman, H. Dam, U. Forssen, J. Karlsson, F. Kronestedt, S. Mazur and K. Molinar, entitled: "Adaptive Antennas for GSM and TDMA Systems", *IEEE Personal Communications*, June 1999, pp. 74–86, all of which are incorporated by reference.

One proposed solution, known as "CDMA/HDR", uses known techniques to measure channel data transfer rate, to carry out channel control, and to mitigate and suppress channel interference. One approach of this type is more particularly described in a paper by Paul Bender, Peter Black, Matthew Grob, Robert Padovani, Nagabhushana Sindhushayana and Andrew Viterbi, entitled: "CDMA/HDR: A Bandwidth Efficient High Speed Wireless Data Service for Nomadic Users", published by Qualcomm Corporation. The disclosure of this article is incorporated herein in its entirety.

Another proposed solution is TIA/EIA interim standard, TIA/EIA/IS-2000-2 published by Telecommunications Industry Association in August, 1999. TIA/EIA/IS-2000-2 is the physical layer standard for cdma2000 spread spectrum systems, also part of the cdma2000 standard series. cdma2000 spread spectrum systems support both voice and data communications.

In cdma2000 systems and many of the new generation personal communications systems, a dedicated pilot is introduced in the reverse link. The reverse link dedicated pilot signal is an unmodulated spread spectrum signal used to assist the base station in detecting a mobile station transmission. The reverse link dedicated pilot signal is integrated at the base station and used for at least two purposes: reverse link power control and coherent demodulation of the reverse link signals.

A reverse link power control mechanism is used to ensure that all the received dedicated pilots at the base station have the same signal to interference-plus noise ratios (SINRs). Even though the received dedicated pilots have the same SINRs, the transmitting powers of these dedicated pilots from different mobile stations can be different. The dedicated pilot transmitting powers depend on the required pilot SINR at the base station and the radio propagation channels.

A coherent demodulation mechanism is used to increase base station receiver sensitivity. It is common knowledge that in most cases coherent demodulation provides approximately 3 dB better receiver sensitivity than non-coherent demodulation. Base station receiver sensitivity is further increased by use of maximum ratio combining (MRC) methods. FIG. 1A shows a typical base station that implements coherent demodulation and maximum ratio combining mechanisms. Signals received from a plurality of receiving elements 10 are transmitted to a corresponding one of analog receivers 12. After processing, the analog signals are converted to digital signals by analog-to-digital converters (ADCs) 14. Coherent demodulators 18 then process signals from ADCs 14 and pilot signal integration circuitry 16. The outputs of demodulators 18 are then transmitted to maximum ratio combiner 19 to output a selected signal.

Although a maximum combining mechanism with multiple antenna elements can increase the base station receiver sensitivity, it does not provide interference cancellation. (In high capacity personal communications systems, the data throughput is usually limited by interference, which is composed of inter-cell and intra-cell interference.) On the other hand, the standard interference cancellation algorithms, for example, a direct matrix inversion algorithm, require a large amount of numerical computations, making the systems either impractical or expensive to build. Thus, a hitherto unsolved need has arisen for a more efficient and practical method for sending data to a base station by a plurality of mobile stations being served without causing unacceptable interference to each other.

A need therefore exists in the art for systems and methods which optimize data throughput without explicit implementation of interference cancellation algorithms of the prior art.

SUMMARY OF THE INVENTION

The present invention is directed to a system and method in which wireless systems, such as mobile stations, transmissions are controlled to reduce interference and thereby provide increased average data rates. According to a preferred embodiment, inter-cell interference is minimized through techniques employing uneven average reverse link data rates with respect to mobile stations. Additionally or alternatively, a preferred embodiment provides minimized intra-cell interference through techniques employing selection of mobile stations having a low correlation between their array response vectors. One or more selected stations can simultaneously transmit during a packet duration with minimal intra-cell interference. Inter-cell interference can also be reduced by allowing mobile stations with lower transmitting power to transfer at a higher time average data rate than mobile stations with a higher transmitting power.

In one embodiment, the mobile stations are divided into two groups, a higher time average data rate group and a lower time average rate group. The mobile stations in the higher time average rate group preferably transmit data more often than the lower time average rate group, with each mobile station in each group transmitting at its maximum instantaneous data rate. The higher time average rate group also preferably has mobile stations with lower transmitting power. This minimizes inter-cell interference.

In another embodiment of the present invention, a first mobile station in a data queue is selected for transmission during a next time interval, although a mobile station selected for transmission during the next time interval may be selected according to other criteria, such as a mobile station having a largest amount of queued data, a mobile station having a longest delay associated with queued data, a mobile station having a particular communication channel attribute associated therewith, and/or the like. Cross correlations of array response vectors between this first mobile station with other mobile stations in the same data rate group are preferably calculated, wherein each cross correlation is associated with two mobile stations. Preferably, mobile stations having cross correlations with the first mobile station that are less than a predetermined threshold are grouped into a first group.

If there are mobile stations in this first group, the mobile station corresponding to the lowest cross correlation is preferably selected as the second mobile station for transmission, along with the first mobile station, during the next time interval. If there are additional mobile stations in the first group, cross correlations between the second mobile station and the rest of the mobile stations in the first group are preferably calculated. If there is at least one cross correlation less than the predetermined threshold, the mobile station corresponding to the lowest cross correlation is preferably selected as the third mobile station for transmission, along with the first and second mobile stations, during the next time interval.

However, if there are no cross correlations less than the threshold or if there are no additional mobile stations in the first group, the cross correlations between the second mobile station and the mobile stations in the other data rate group as well as the cross correlations between the first mobile station and the mobile stations in the other data rate group are preferably calculated. The calculated cross correlations are preferably analyzed to determine which, if any, mobile stations have cross correlations with respect to each of the first mobile station and the second mobile station which are below the predetermined threshold. According to a preferred embodiment, if there are no mobile stations having both cross correlations less than the predetermined threshold, only the two mobile stations are selected for transmission during the next time interval. However, if there is at least one mobile station having both cross correlations less than the threshold, a third mobile station is preferably selected for simultaneous communication during the next time interval. Preferably, if there is more than one mobile station having both cross correlations below the threshold, the cross correlations for each mobile station is summed and the mobile station having the lowest combined cross correlations is selected as the third mobile station for transmission during the next time interval.

If there are no mobile stations in the first group, the cross correlations between the first mobile station with mobile stations in a second data rate group are preferably calculated. Mobile stations in the second data rate group having cross correlations less than the predetermined threshold are preferably grouped into a second group. According to a preferred embodiment, if there are no mobile stations in the second group, only the first mobile station is selected for transmission during the next time interval. However, if there is one or more mobile stations in the second group, the mobile station corresponding to the lowest cross correlation is preferably selected as the second mobile station for transmission, along with the first mobile station, during the next time interval. According to a preferred embodiment, if there is only one mobile station in the second group, only the two mobile stations are selected for transmission during the next time interval.

However, if there are two or more mobile stations in the second group, cross correlations between the second selected mobile station and the rest of the mobile stations in the second group are preferably calculated. Mobile stations in the second group having cross correlations with respect to the second selected mobile station less than the predetermined threshold are preferably grouped into a third group. According to a preferred embodiment, if there are no mobile stations in the third group, no further mobile stations are selected for transmission during the next time interval. However, if there is at least one mobile station in the third group, the mobile station corresponding to the lowest cross correlation is selected as the third mobile station for transmission, along with the first and second mobile stations, during the next time interval.

According to alternative embodiments of the invention, additional mobile stations are selected, such as through repetition of the grouping patterns outlined above, as desired. The selected mobile stations are preferably each transmitted to and/or from during the next time interval, according to the present invention.

In another embodiment, a first mobile station in the data queue is preferably selected for transmission during a next time slot, as with the previous embodiment. However, in contrast to the previous embodiment, the cross correlation of the array response vectors of the first mobile station and all the other mobile stations are preferably computed and compared to a predetermined threshold. According to this embodiment, all mobile stations with cross correlations below the threshold are candidates for selection. Preferably, if there are no such mobile stations, only the first mobile station is selected for transmission during the next time slot. However, if there is one such candidate, this candidate is preferably selected as the second mobile station, which, along with the first selected mobile station, transmits during the next time interval.

If there is more than one candidate for selection, the cross correlations of all the candidates are preferably calculated and compared to the predetermined threshold. If one or more cross correlations is below the threshold, the pair of mobile stations having the smallest combined average transmitting power are preferably selected as the second and third mobile stations for transmission, along with the first mobile station, during the next time interval. However, if there are no cross correlations below the threshold, the mobile station from the group of candidates having the smallest transmitting power is preferably selected as the second mobile station, and only the first and second mobile stations will transmit during the next time interval.

In yet another embodiment, each of a total of N mobile stations has an associated measured response vector V. In contrast to earlier embodiments, which selected a variable number of mobile stations for each time interval (e.g., 1, 2, 3, etc. mobile stations), a fixed number L (such as 3) of mobile stations are preferably selected according to this embodiment for each of K communication time intervals. A list is preferably created in which the mobile stations that are desired for earlier selection are included more times than other mobile stations. L mobile stations are preferably selected from the list, such as randomly, and a cost function is preferably calculated by summing the cross correlations of the response vectors of the L selected mobile stations. According to a preferred embodiment, if the value of the cost function is less than the threshold, these L mobile stations are chosen to comprise the first time slot. These L mobile stations are then preferably removed from the list. However, if the value of the cost function is greater than or equal to the threshold, another L mobile stations are preferably selected from the list and their cost function is preferably calculated. According to a preferred embodiment, this processes is repeated until a cost function is calculated that is less than the threshold, at which time, the associated L mobile stations are selected and removed from the list.

If, after repeating the mobile station selection and cost function calculation process a predetermined number of times M without obtaining a cost function less than the threshold, the set of mobile stations having the smallest value cost function out of the set of M groups is preferably selected and removed from the list. These steps are preferably repeated until K groups of L mobile stations are selected for the K communication time slots.

Accordingly, a technical advantage of the present invention is provided in that optimization of data throughput is provided by selecting particular wireless communication systems for communication during a time interval, wherein each such system is preferably operated at a maximum instantaneous data rate, without explicit implementation of interference cancellation algorithms.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

Wherein use of the same or similar reference numbers in different figures indicates same or like elements.

DETAILED DESCRIPTION

Figure 1A:
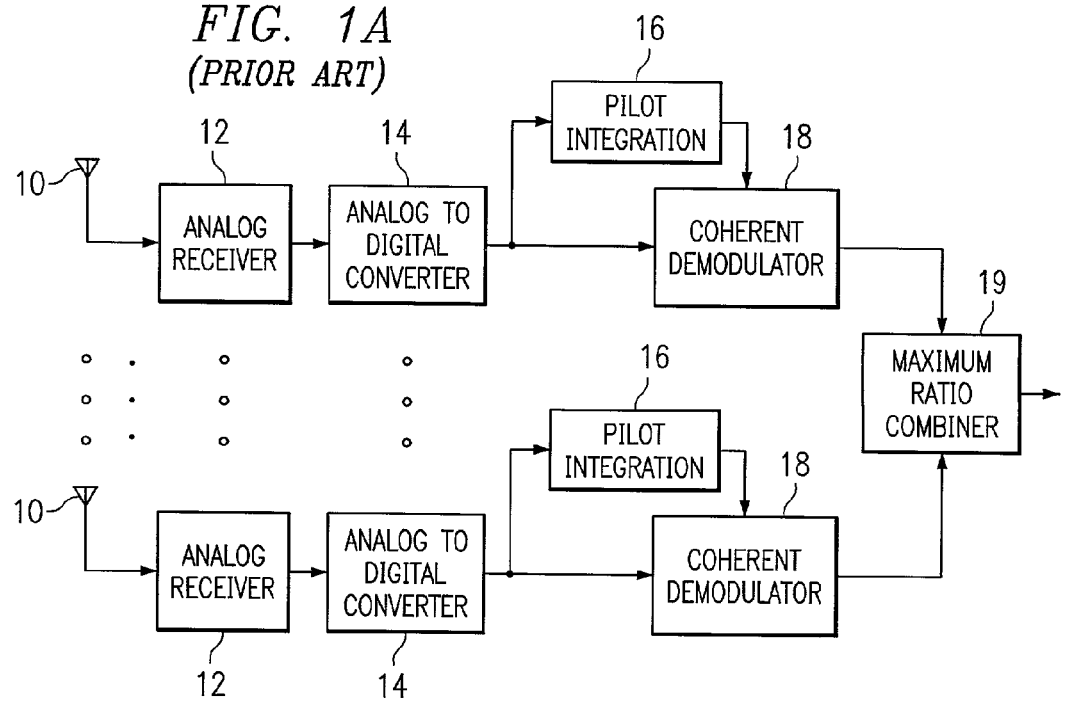
FIG. 1A shows a typical base station that implements coherent demodulation and maximum ratio combining mechanisms.

Preferred embodiments of the present invention minimize inter-cell interference through uneven average reverse link data rates experienced by the mobile stations and minimize intra-cell interference without explicit implementation of an interference cancellation algorithm, through choosing the mobile stations that have low correlation between their array response vectors, hence maximizing the reverse link data throughput. Array response vectors of the preferred embodiment provide information with respect to a wireless communication signal as received at or provided to antenna elements of an antenna array, such as an antenna array having a plurality of antenna elements disposed in a predetermined geometry suitable for use in beamforming by applying beamforming weighting (phase and/or amplitude) with respect to signals of antenna elements of the array. Methods and structures for providing rapid beamforming for both uplink and downlink channels using adaptive antenna arrays are described in the above referenced U.S. patent applications entitled "Practical Space-Time Radio Method for CDMA Communication Capacity Enhancement".

For a given instantaneous reverse link data rate, such as in cdma2000, HDR, and GSM systems for example, different mobile stations at different locations and moving conditions (hence different radio propagation channels) have different transmitting powers.

The worse the radio propagation channels (i.e., the higher the power attenuation in the channel), the higher will be the mobile station transmitting power.

One method to minimize the inter-cell interference according to the present invention is to allow the lower transmitting power mobile stations to transfer a higher time average data rate than the higher transmitting power mobile stations. For example, by assigning more time slots in a transmission time interval to the lower transmitting power mobile stations transmitting at a maximum instantaneous data rate and assigning fewer time slots in the transmission time interval to the higher transmitting power mobile stations transmitting at the maximum instantaneous data rate, the lower transmitting power mobile stations will be provided a higher time average data rate while the higher transmitting power mobile stations are provided a lower time average data rate.

According to a preferred embodiment of the present invention, a highest time average data rate is N times that of a lowest time average data rate, and the instantaneous data rate for each mobile station is kept at a possible maximum, M, where N might be from about 3 to about 9, while M may be about 150 Kbps for cdma2000 and 300 Kbps for HDR, for example. For a given N and M, in order to minimize the overall mobile stations' transmitting power according to a preferred embodiment of the present invention, the mobile stations are preferably divided into groups, such as a higher time average data rate group of mobile stations associated with the highest time average data rate and a lower time average data rate group of mobile stations associated with the lowest time average data rate. Preferably the groupings of mobile stations are selected so as to achieve a lowest average transmit power level with respect to the total number of mobile stations transmitting, e.g., mobile stations requiring a higher transmit power level are associated with the lower time average data rate group and mobile stations operating with a lower transmit power level are associated with the higher time average data rate group with the delineation between the two groups being a function of minimizing the average power associated with the mobile stations' transmissions.

If all the mobile stations are allowed to transmit only at the highest instantaneous data rate, then the aforementioned higher time average data rate mobile stations will transmit N times more often, or N times longer, than the aforementioned lower time average data rate mobile stations. Accordingly, it should be appreciated that in such an embodiment the ratio of the time average data rates of the aforementioned higher time average data rate group and the lower time average data rate group is N.

For an example, assume that there are total of K mobile stations in a particular cell or a sector of a cell, all of which have data to transmit. The transmitting power required to transmit the highest instantaneous data rate for the $k^{th}$ mobile station may be denoted as $P_k$. Without loss of generality, it can be assumed that $P_1 \leq P_2 \leq \ldots \leq P_K$. After dividing the K mobile stations into two different data rate groups, e.g., the aforementioned higher time average data rate group and lower time average data rate group, and allowing only one mobile station to transmit at a time, the overall average mobile stations' transmitting power is given below by equation (1).

$$AP = \frac{N \cdot \sum_{k=1}^{J} P_k + \sum_{k=J+1}^{K} P_k}{(N-1) \cdot J + K} \tag{1}$$

It should be appreciated that in equation (1), J is between 1 and K, inclusively, and delineates the mobile stations of the higher time average data rate group and the mobile stations of the lower time average data rate group. As discussed above, J is preferably selected so that AP (the average power) is minimum for a given $P_k$. By reducing the average power associated with the K mobile stations, inter-cell interference is minimized according to the present invention.

Preferred embodiments of the present invention provide for increased data capacity communications. For example, according to a preferred embodiment multiple mobile stations, such as multiple ones of the aforementioned K mobile stations in a cell or a sector of a cell, are allowed to transmit data simultaneously to thereby provide data capacity increases above that associated with the above described one mobile station at a time transmitting. However, it should be appreciated that, if more than one mobile station in such a cell or sector is allowed to transmit simultaneously to a base station, the transmissions of these other mobile stations will likely cause intra-cell interference.

Explicit implementation of an interference cancellation algorithm, such as a directed matrix inversion algorithm, can help to reduce intra-cell interference by removing interfering signal components from a received signal. However, such interference cancellation algorithms are typically processor intensive and, thus, difficult and/or expensive to implement.

Accordingly, preferred embodiments of the present invention proactively minimize intra-cell interference by allowing only those mobile stations that have low correlations between their array response vectors to transmit data at the same time. For example, by modifying receiver architecture that implements a maximum ratio combining (MRC) algorithm, such as that shown in FIG. 1A, preferred embodiments of the present invention may operate to identify those mobile stations having low array response vector correlation and control communication such that only those mobile stations that have an array response vector correlation below a predetermined threshold to transmit simultaneously. Minimizing intra-cell interference in this manner is referred to herein as directed MRC (DMRC). A base station adapted according to a preferred embodiment of the present invention is shown in FIG. 1B having cross correlation estimators 101 coupled to scheduler 102 to implement DMRC according to the present invention.

The following example illustrates a preferred embodiment implementation of DMRC, with a maximum number of simultaneously transmitting mobile stations of 3. Assuming that K=5, J=3, N=3, and all the 5 mobile stations have continuous data streams to be transmitted at the maximum instantaneous data rate, then the data queue of these 5 mobile stations may look like data queue 200 shown in FIG. 2. Specifically, data queue 200 shows 11 data packets, U, associated with 5 mobile stations, mobile stations 1–5. The duration of data packets U shown in FIG. 2 are on the order of 50 ms according to a preferred embodiment, although other data packet durations and even data packets of varying durations may be accommodated according to the present invention.

Figure 2:
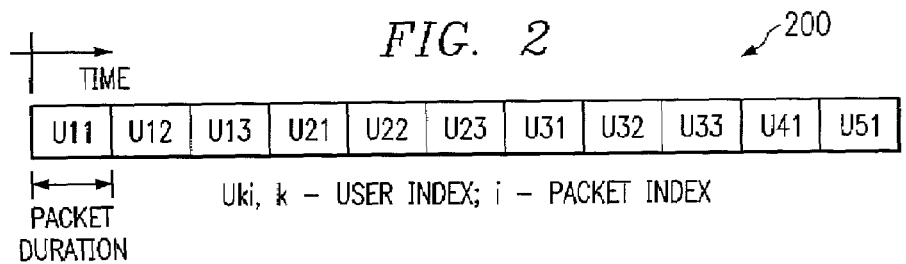
FIG. 2 shows an illustrative data queue at successive time periods for one embodiment of the present invention.

The data packet designators of FIG. 2 are in the form Uki, wherein k is a mobile station index and I is a packet index. More specifically, mobile station 1 has data packets U11, U12, and U13 associated therewith, mobile station 2 has data packets U21, U22, and U23 associated therewith, mobile station 3 has data packets U31, U32, and U33 associated therewith, mobile station 4 has data packet U41 associated therewith, and mobile station 5 has data packet U51 associated therewith. Accordingly, the first data packet of data queue 200 waiting to be transmitted is data packet U11 from mobile station 1 with packet index of 1. It should be appreciated, however, that the data packets of queue 200 are exemplary and the present invention is not limited to the illustrated number of mobile stations for which data packets are queued, the illustrated number of data packets queued, or the illustrated distribution of data packets among the mobile stations.

Figure 1B:
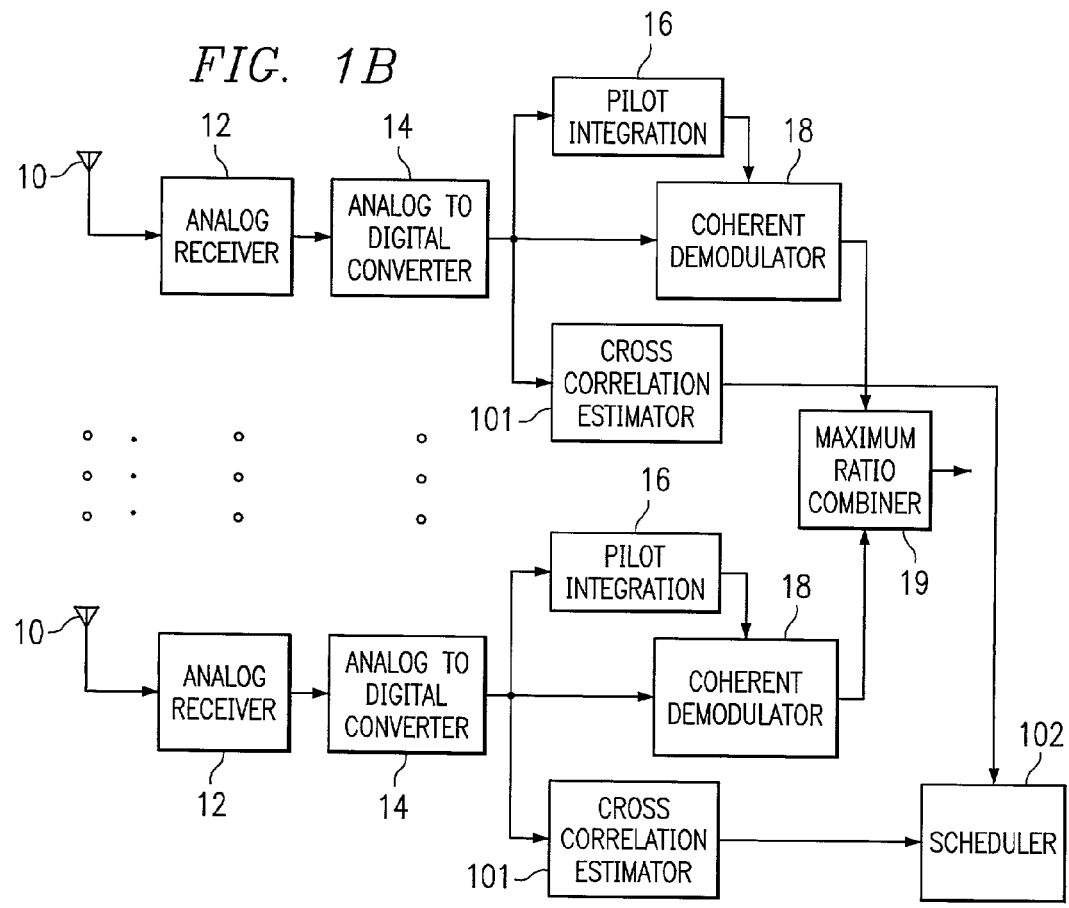
FIG. 1B shows a base station adapted according to a preferred embodiment of the present invention.

Assume the cross correlations between the 5 exemplary mobile stations' normalized array response vectors (ARVs), such as may be determined using cross correlation estimators 101 of FIG. 1B, are as shown in Table 1 below.

TABLE 1

| Mobile Station Index | Mobile Station Index | Cross Correlation (dB) |
|---|---|---|
| 1 | 2 | −12 |
| 1 | 3 | −6 |
| 1 | 4 | −19 |
| 1 | 5 | −2 |
| 2 | 3 | −15 |
| 2 | 4 | −6 |
| 2 | 5 | −21 |
| 3 | 4 | −1 |
| 3 | 5 | −9 |
| 4 | 5 | −11 |

Wherein the cross correlation values of Table 1 are given in dB (20 times the log based 10 of the complex modulus of the normalized ARVs cross correlations).

For example, the array response vector of each mobile station may be measured by integrating its reverse link dedicated pilot for a specific integration interval, which can vary from a fraction of a millisecond to a few tens of milliseconds. The array response vector of each mobile station may preferably be normalized, such as to a unitary vector magnitude, for cross correlation. Each combination of two mobile stations' array response vectors may then be cross correlated to provide correlation values such as shown in Table 1.

In order for multiple mobile stations to simultaneously transmit high data rate to the base station according to a preferred embodiment of the present invention, the simultaneously transmitting mobile stations' signals should not cause excessive or intolerable interference with respect to one another. Array response vector cross correlation of the present invention provides an indication of the level of interference associated with simultaneous transmission by each combination of the mobile stations. For example, if the cross correlation is less than a predefined threshold, such as −10 dB or some other value determined to be associated with an acceptable level of interference, then the mobile stations may be operated according to the present invention to simultaneously transmit high data rates, such as under control of scheduler 102 of FIG. 1B.

Figure 3A:
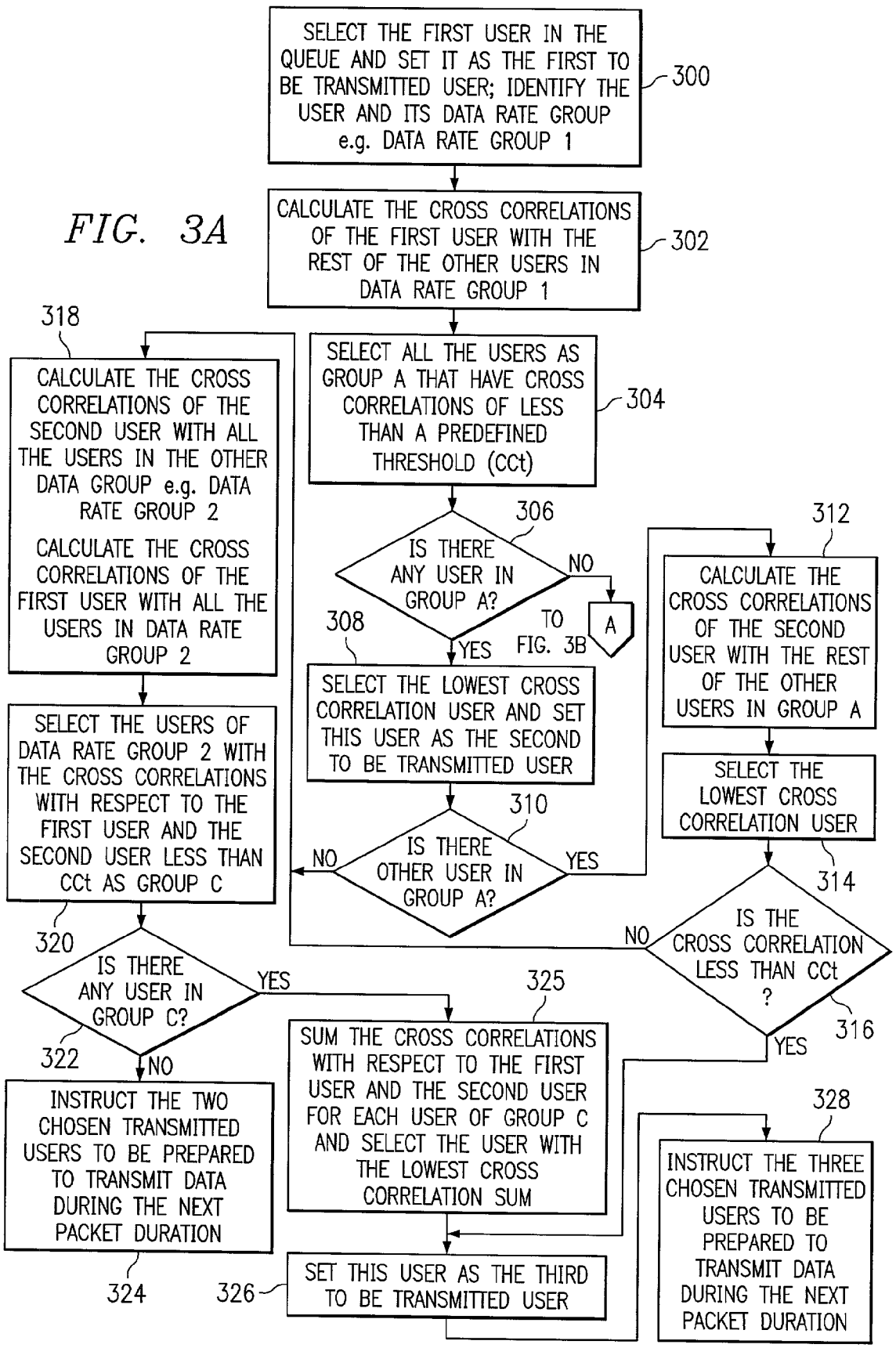
FIGS. 3A and 3B are portions of a flow chart illustrating one embodiment of the present invention.
Figure 3B:
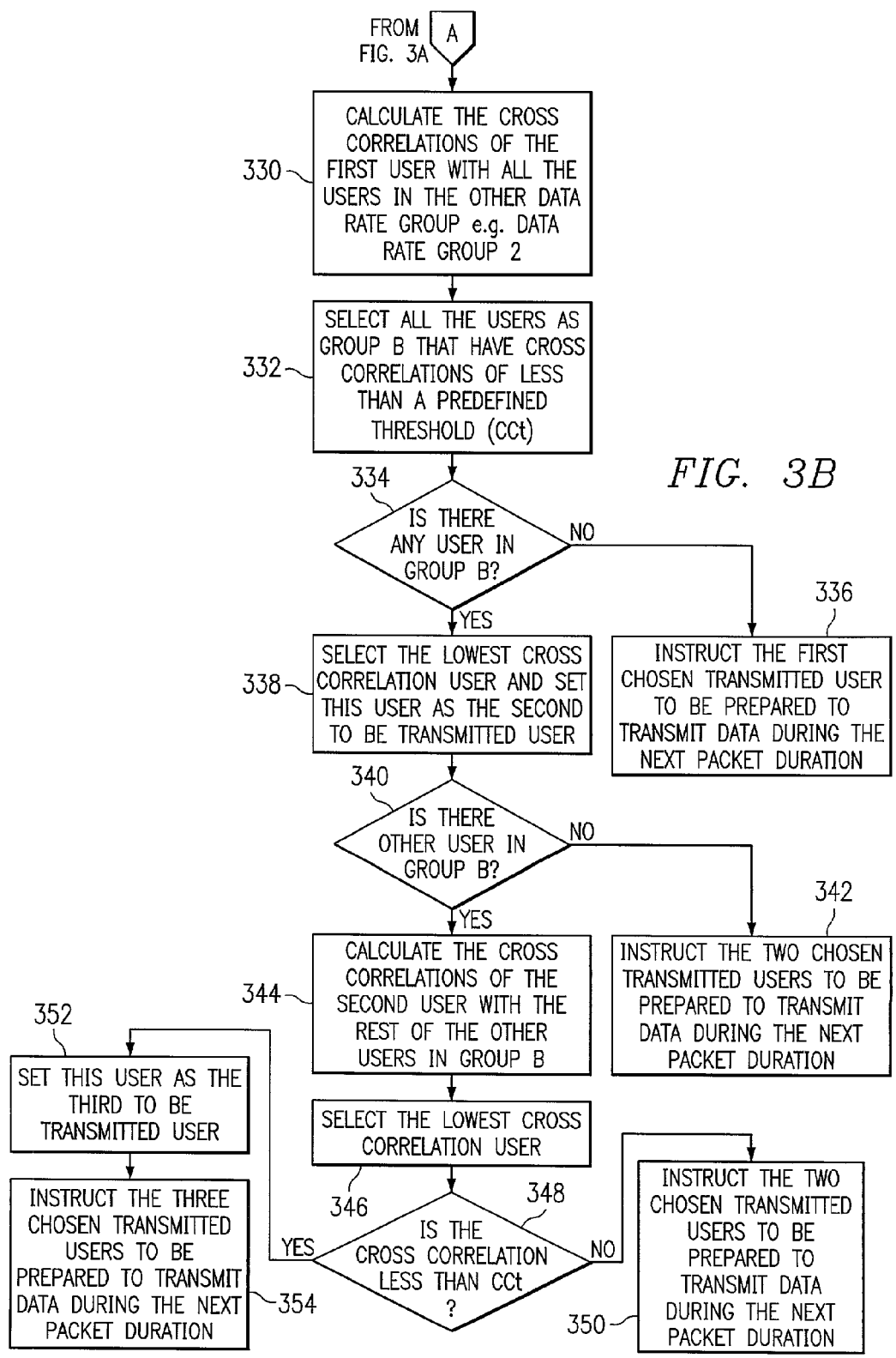

A preferred embodiment method for determining mobile stations which can simultaneously transmit reverse link data in the next packet duration (e.g., frame time slot) is shown in the flowchart of FIGS. 3A and 3B. In order to more easily understand the concepts presented by the exemplary flowchart of FIGS. 3A and 3B, in addition to the assumptions with respect to the exemplary embodiment discussed above, it is also assumed that the radio propagation environment is static so the correlation of all the array response vectors are static as shown in Table 1. However, it should be appreciated that in particular implementations, such as the highly mobile environment of cellular telephony communications, the array response vectors would change appreciably with time. Accordingly, in such an embodiment the flowchart of FIGS. 3A and 3B might return periodically to the illustrated cross correlation steps, such as every packet duration, every transmission frame, or every transmission super frame, to update the cross correlations accordingly.

It should be noted that the following description describes selection of three or less mobile stations. However, such an embodiment is for illustrative purposes and is not intended to be limiting with respect to the number of mobile stations which may be selected for simultaneous transmission according to the present invention. Thus, more than three mobile stations can be selected utilizing the aspects of the present invention.

At step 300 of FIG. 3A, the mobile stations have preferably already been identified with data rate groups, such as the higher data rate group and lower data rate group discussed above. In the embodiment of FIG. 3A, the first mobile station having data in the data queue is preferably selected as the first mobile station for data transmission during the next time interval in step 300. The selected mobile station and its corresponding data rate group, e.g., data rate group 1 which may be one of the above described higher time average data rate group or lower time average data rate group, for example, are preferably identified.

At step 302, the cross correlations between the first mobile station and the remaining mobile stations in data rate group 1 are calculated. Mobile stations in the data rate group 1 that have cross correlations less than a predefined threshold, CCt, are selected as mobile stations in a new group, e.g., simultaneous transmission candidate group A, in step 304.

If there are mobile stations in data rate group 1 having cross correlations less than CCt, i.e., mobile stations for simultaneous transmission candidate group A, as determined in step 306, the mobile station in group A with the lowest cross correlation is selected as the second mobile station for data transmission during the next time interval in step 308, i.e., the first and second mobile stations are selected for simultaneous transmission. If there are further mobile stations in group A, as determined in step 310, the cross correlations of the second mobile station with the rest of the mobile stations in group A are calculated in step 312. In step 314, the lowest cross correlation calculated in step 312 is selected and compared with threshold CCt in step 314. If this cross correlation is less than CCt, the mobile station corresponding with the cross correlation is selected as the third mobile station for data transmission during the next time interval in step 326, i.e., the first, second, and third mobile stations are selected for simultaneous transmission. In step 328, the three selected mobile stations are notified to prepare for to transmit data during the next packet duration.

However, if, as determined in respective steps 310 or 316, there are no other mobile stations in group A or the cross correlation selected in step 314 is greater than or equal to CCt, the cross correlations of the second mobile station with the mobile stations in another data rate group, e.g., data rate group 2 which may be the other one of the above described higher time average data rate group or lower time average data rate group, for example, are calculated and the cross correlations of the first mobile station with the mobile stations in this other data rate group are calculated in step 318. After selecting the users of this other data rate group having cross correlations with respect to the first user and the second user each less than CCt as group C in step 320, it is determined if there are any users in group C in step 322. If there are no users in group C, only the first two selected mobile stations determined in steps 300 and 308 are chosen to transmit data during the next time interval, in step 324, and these two mobile stations are notified to prepare for data transmission during the next packet duration. However, if there are users in group C, the cross correlations with respect to the first user and the second user for each user of group C are summed and the user of group C with the lowest summed cross correlations is selected in step 325. The mobile station selected in step 325 is selected as the third mobile station for data transmission during the next time interval in step 326. These three mobile stations are then notified in step 328 to prepare for data transmission during the next packet duration.

If, after selecting the first mobile station in step 300, there are no other mobile stations in data rate group 1 having cross correlations less than threshold CCt, the cross correlations of the first mobile station with the mobile stations in another data rate group, e.g., data rate group 2, for example, are calculated in step 330 of FIG. 3B. All mobile stations in data rate group 2 having cross correlations less than threshold CCt are selected as mobile stations in a new group, e.g., simultaneous transmission candidate group B, in step 332. If there are no mobile stations in group B, as determined in step 334, only the first mobile station is instructed, in step 336, to transmit data during the next time interval. However, if there are mobile stations in group B, the mobile station having the lowest cross correlation is selected, in step 338, as the second mobile station for data transmission during the next time interval. If this is the only mobile station in group B, as determined in step 340, the two selected mobile stations are instructed in step 342 to prepare to transmit data during the next packet duration.

If there is more than one mobile station in group B, the cross correlations of the second mobile station (selected in step 338) with the rest of the mobile stations in group B are calculated in step 344. The lowest cross correlation as between the second mobile station and the mobile stations of group B is selected in step 346 and compared with threshold CCt in step 348. If this cross correlation is greater than or equal to CCt, only the first two selected mobile stations determined in steps 300 and 338 are chosen to transmit data during the next time interval, step 350, and the first and second mobile stations are instructed to prepare to transmit data during the next packet duration. However, if this cross correlation is less than CCt, the mobile station corresponding to this cross correlation is selected in step 352 as the third mobile station for data transmission during the time interval.

The three selected mobile stations are then instructed, in step 354, to prepare for data transmission during the next packet duration.

After the selected mobile stations (one, two, or three in this example) have finished transmitting for one packet duration, their new data packets will preferably be added to the end of the queue. Accordingly, operation of the above preferred embodiment method will provide data communication for all mobile stations as the steps of the method are repeated.

Figure 4:
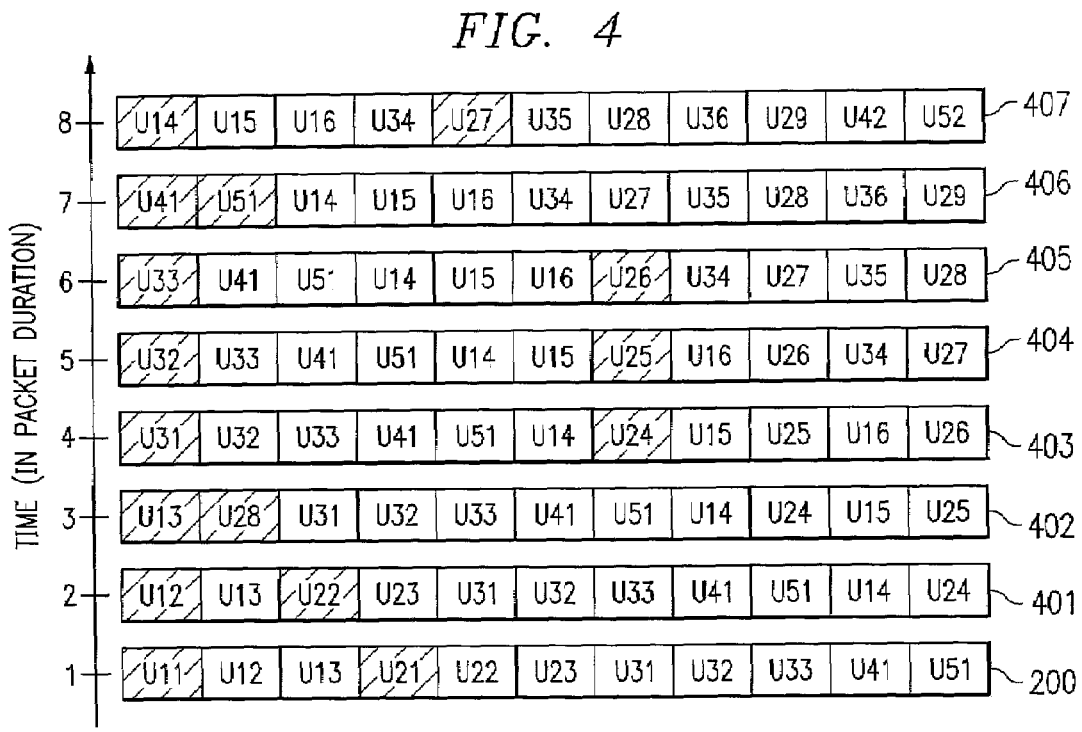
FIG. 4 shows an illustrative data queue at successive time periods for the embodiment of FIGS. 3A and 3B.

After implementing the above discussed preferred embodiment method of FIGS. 3A and 3B with 5 mobile stations having channel characteristics as set forth in Table 1, queued data as shown in queue 200 of FIG. 2, and CCt=−10 dB, the queued data may be removed from the queue for transmission as shown in FIG. 4, wherein time progresses along the vertical axis. For example, during the first time interval, data packets U11 and U21 of queue 200 (shaded in FIG. 4) are transmitted, resulting in queue 401. Repeating the steps of FIGS. 3A and 3B, data packets U12 and U22 of queue 401 are transmitted during the second packet duration. Similarly, data packets U13 and U23 of queue 402 are transmitted during the third packet duration, data packets U31 and U24 of queue 403 are transmitted during the fourth packet duration, data packets U32 and U25 of queue 404 are transmitted during the fifth packet duration, data packets U33 and U26 of queue 405 are transmitted during the sixth packet duration, data packets U41 and U51 of queue 406 are transmitted during the seventh packet duration, and data packets U14 and U26 of queue 407 are transmitted during the eighth packet duration. Accordingly, data communication needs of each of the mobile stations are served according to the preferred embodiment method while data capacity is increased through simultaneous transmission scheduling with minimum intra-cell interference.

It should be appreciated, in the example illustrated in FIG. 2, that entry of data packets associated with particular mobile stations has been controlled according to a preferred embodiment of the present invention. Specifically, as discussed above, it is desirable to reduce inter-cell interference and, according to a preferred embodiment of the present invention, inter-cell interference may be controlled through the providing of a higher time average data rate to mobile stations transmitting at a lower power level and providing a lower time average data rate to mobile stations transmitting at a higher power level. Accordingly, although each of the 5 mobile stations are assumed to have continuous data streams, data packets associated with mobile station 1, mobile station 2, and mobile station 3, each of which has been determined to be associated with the higher time average data rate group as described herein, are placed in queue 200 three times (i.e., N=3) more often than data packets associated with mobile station 4 and mobile station 5, each of which has been determined to be associated with the lower time average data rate group as described herein. Accordingly, operation of the preferred embodiment method as described herein scheduling data transmission from queue 200 provides inter-cell interference minimization.

However, note that the actual higher time average data rate may not be 3 times of the lower time average data rate in the above described embodiment. For example, although mobile station 4 and mobile station 5 are associated with the lower time average data rage group, these stations may be disposed in a particular position or orientation such that their communications are compatible, i.e., their cross correlations are below CCt, with many or all other mobile stations. Accordingly, such a mobile station may be selected for communications more often than their associated time average data rate group would otherwise suggest.

In radio propagation environments likely to be experienced with actual deployments of the present invention, the array response vectors (ARVs) of the mobile stations would be expected to change with time. Accordingly, the cross correlations of the ARVs would also be expected to change. Therefore, according to a preferred embodiment of the present invention, right before selection of the next combination of transmitting packet(s) according to the steps set forth above, the cross correlations between all the mobile stations are preferably updated.

Assuming one ARV of each mobile station is generated every millisecond and there are L new ARVs since the last update, then the cross correlation (CC) between mobile station i and mobile station j can be defined as shown in equation (2) below.

$$CC_{ij} = 10 \cdot \log\left(\frac{\sum_{i=1}^{L} |ARV'_{il} \cdot ARV_{jl}|^2}{L}\right) \quad (2)$$

It should be appreciated that | | is the complex modulus function and ' is the complex conjugate transpose function. L can be approximately the ratio of the packet duration and the ARV integration period.

Figure 5:
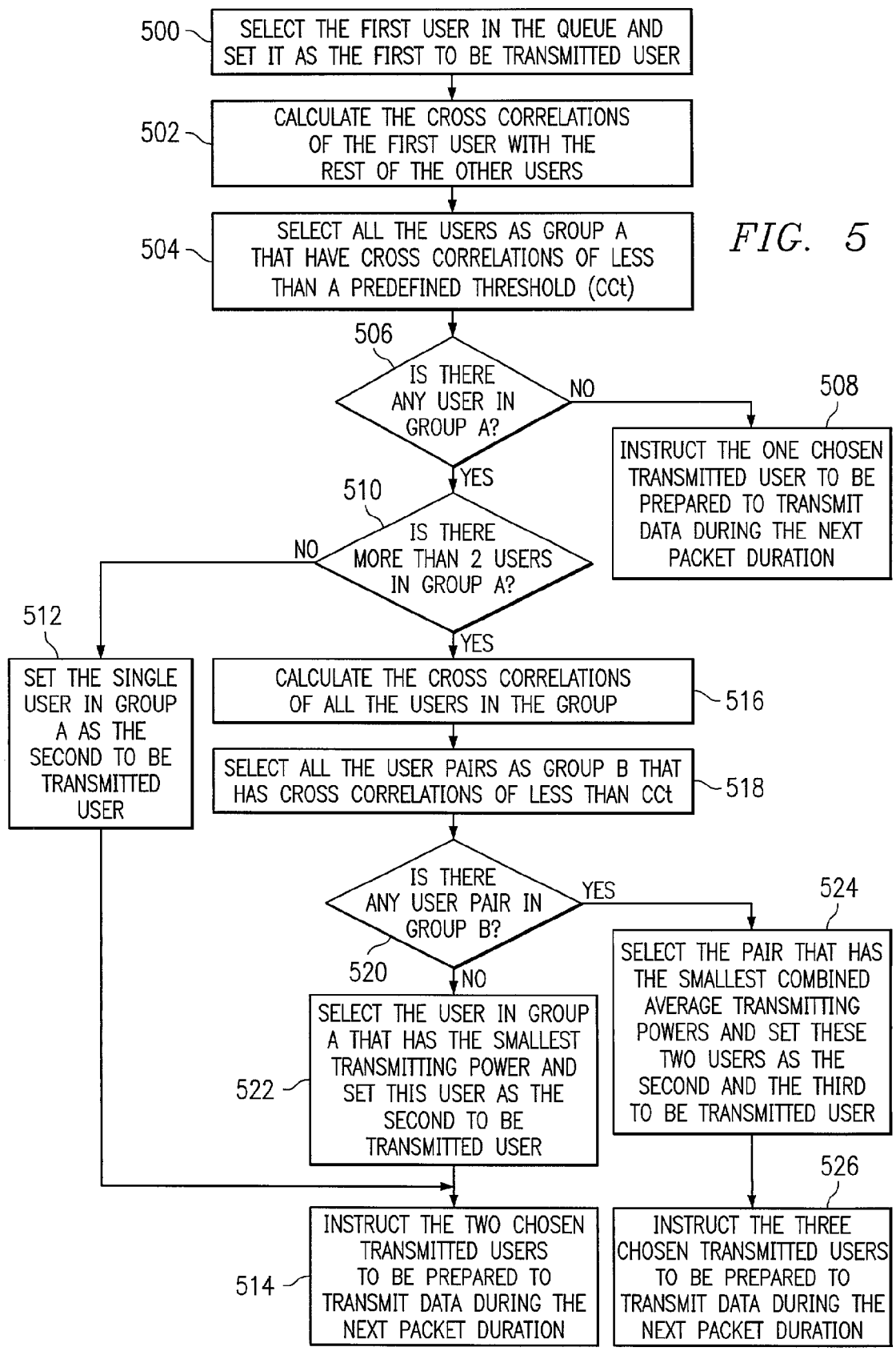
FIG. 5 is a flow chart illustrating another embodiment of the present invention.

Another preferred embodiment method to minimize inter-cell interference and intra-cell interference is described by the flowchart shown in FIG. 5. In step 500, the first mobile station in the queue is selected and set as the first mobile station for data transmission. The cross correlations of the first mobile station with the rest of the mobile stations are calculated in step 502. Mobile stations having cross correlations less than a predefined threshold CCt are selected in step 504 as mobile stations for a first group of simultaneous transmission candidates (group A). If there are not any mobile stations in group A, as determined in step 506, only the first mobile station is instructed, in step 508, to transmit data during the next time interval. However, if there is only one mobile station in group A, as determined in step 510, the one mobile station is selected in step 512 as the second mobile station for data transmission during the next time interval, i.e., the first and second mobile stations are selected for simultaneous transmission. The two selected mobile stations are then instructed, in step 514, to prepare to transmit data during the next packet duration.

If there are more than one mobile station in group A, the cross correlations between all the mobile stations in group A are calculated in step 516. In step 518, all pairs of mobile stations that have cross correlations less than CCt are selected as a second group of simultaneous transmission candidates (group B). If there are no pairs of mobile stations in group B, as determined in step 520, the mobile station in group A having the lowest transmitting power is selected in step 522, and this mobile station is set as the second mobile station for data transmission during the next time interval. The first and second selected mobile stations are then instructed, in step 514, to prepare to transmit data during the next packet duration. However, if there is at least one pair of mobile stations in group B, the pair that has the lowest combined average transmitting power is selected, in step 524, as the second and third mobile station for data transmission during the next time interval, i.e., the first, second, and third mobile stations are selected for simultaneous transmission. The three selected mobile stations are instructed to prepare for data transmission during the next packet duration in step 526. After the chosen mobile stations have finished transmitting for one packet duration, their new packets will preferably be added to the end of the queue.

To illustrate operation of this preferred embodiment method, the example assumptions as described above with respect to the method of FIGS. 3A and 3B are used with the method of FIG. 5, except hat N is now 1. Again, in order to simplify the concepts illustrated in the example, it is assumed that the radio propagation environment is static so the correlation of all the ARVs is also static as shown in Table 1. However, the transmitting powers of all the mobile stations are taken into account in determining which mobile stations can transmit reverse link data in the next packet duration. Example relative power levels that are required with respect to the 5 exemplary mobile stations to transmit at the highest data rate are shown in Table 2 below.

TABLE 2

| Mobile station Index | Relative Mobile station Transmitting Power (W) |
|---|---|
| 1 | 1 |
| 2 | 0.1 |
| 3 | 2 |
| 4 | 0.01 |
| 5 | 10 |

For example, in HDR, the relative levels of the transmitting powers of all the mobile stations, as shown in Table 2, can be estimated from the reverse link power control process and the data rate control channel in the reverse link.

It should be appreciated that in particular implementations, such as the highly mobile environment of cellular telephony communications, the radio propagation channels, and therefore the array response vectors and/or relative levels of the transmitting powers, would change appreciably with time. Accordingly, the information of Table 1 and/or Table 2 may advantageously be updated periodically. In such an embodiment the flowchart of FIG. 5 might return periodically to the illustrated cross correlation steps and/or re-determine power levels, such as every packet duration, every transmission frame, or every transmission super frame, to update the information relied upon in operation accordingly. For example, the data of both Table 1 and Table 2 may be updated about every 5 packet durations according to a preferred embodiment.

Figure 6:
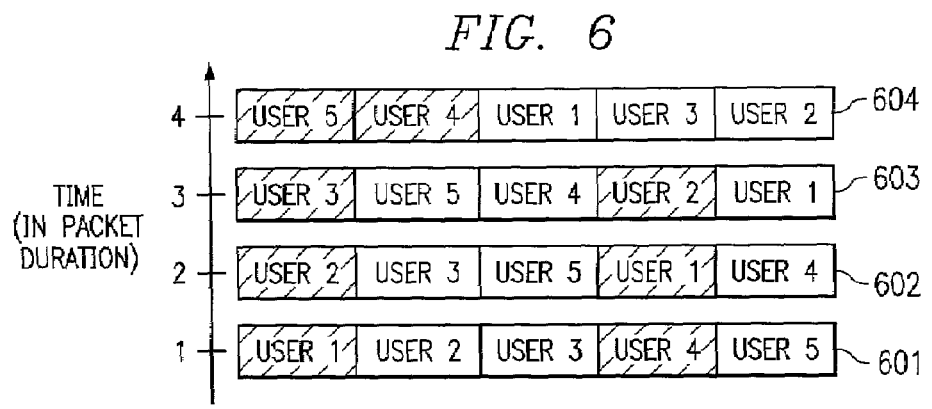
FIG. 6 shows an illustrative data queue at successive time periods for the embodiment of FIG. 5.

After implementing the above discussed preferred embodiment method of FIG. 5 with 5 mobile stations having channel characteristics as set forth in Table 1 and Table 2, queued data as shown in queue 200 of FIG. 2, and CCt=−10 dB, data may be removed from the queue for transmission as shown in FIG. 6, wherein time progresses along the vertical axis. For example, during the first time interval, data packets associated with mobile station 1 (data packets U11, U12, and U13) and mobile station 4 (data packet U41) of queue 200, as represented by the shaded user blocks of queue 601 FIG. 6, are transmitted in a first time interval, resulting in queue 602. Repeating the steps of FIG. 5, data packets associated with mobile station 2 and mobile station 1 of queue 602 are transmitted during a second time interval, resulting in queue 603. Similarly, data packets associated with mobile station 3 and mobile station 2 are transmitted during a third time interval resulting in queue 604, and data packets associated with mobile station 5 and mobile station 4 are transmitted during a fourth time interval. Accordingly, data communication needs of each of the mobile stations are served according to the preferred embodiment method while data capacity is increased through simultaneous transmission scheduling with minimum intra-cell interference.

According to another preferred embodiment of the present invention, an algorithm is provided for selecting groups of mobile stations for simultaneous transmission. The members of each group are preferably controlled to transmit during a same time slot wherein their signals are separated by spatial processing of the base station beamformer. In contrast to earlier embodiments, which selected a variable number of mobile stations for each time interval (e.g., 1, 2, 3, etc. mobile stations), a fixed number L (such as 3) of mobile stations are preferably selected according to this embodiment for each of K communication time intervals.

For example, assume there is a total of Nu mobile stations, where the nth mobile station has a measured response vector V(n), and there are Ns time slots available for assignment. The response vectors are assumed to be constant during the selection process. The preferred embodiment algorithm selects groups of Ng mobile stations(typically Ng is in the range of 1 to 4), where each group will be assigned a given time slot.

The preferred embodiment algorithm starts by creating a list of Ns*Ng mobile stations. Each mobile station may be listed a different number of times, corresponding to the relative frequency with which that mobile station needs to be served. As a specific example, consider the case where there are Nu=30 mobile stations, with a group size of Ng=3, and where 10 of the mobile stations need to be served twice as frequently as the other 20. The minimum size of the list will therefore be 40 (2*10+20). The algorithm performs better if the list is made larger. Thus, a list size of 6*40=240, for example, corresponds to Ns=240/3=80 time slots.

Once the preferred embodiment list is created, Ng mobile stations are preferably selected at random off of the list. A cost function comprising of the sum of the cross correlations of the response vectors (Vs) of the mobile stations is preferably computed for the Ng selected mobile stations. For example, if Ng=3, the cost function is preferably computed as shown below in equation (3).

$$\text{cost}=|V(n1)'*V(n2)|^2+|V(n2)'*V(n3)|^2+|V(n3)'*V(n3)|^2 \quad (3)$$

In equation (3) above, n1, n2, and n3 are the index numbers of the selected mobile stations, || is the complex modulus function and ' is the complex conjugate transpose function.

If the computed cost is smaller than a specified threshold value, the Ng selected mobile stations are chosen as a group according to the preferred embodiment. If the computed cost is larger than the threshold value, another set of Ng mobile stations is randomly selected from the list, and their cost function computed. This process is preferably repeated at most N times (where N is a predetermined value). If after N trials, no set of mobile stations with sufficiently small cost has been found, the process is terminated and the set of mobile stations with the smallest cost of the N sets is chosen as a group.

Once a set of mobile stations has been chosen as a group, those mobile stations are preferably removed from the list. The above steps are preferably repeated until the list is empty, e.g., when Ns groups have been created. When the list is empty, a new list is created and the above steps are preferably again repeated.

The above-described embodiments of the present invention are merely meant to be illustrative and not limiting. It will thus be obvious to those skilled in the art that various changes and modifications may be made without departing from this invention in its broader aspects. For example, several of the embodiments are described with selection of three or less mobile stations for simultaneous transmission. However, additional mobile stations can be selected using the present invention to reduce intra-cell interference in the reverse link. Similarly, the preferred embodiments have been discussed above with reference to mobile stations, although it should be appreciated that the present invention is not limited to use with any particular form of communication device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or late to be developed that perform substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of transmitting data from a plurality of mobile stations to a base station, the method comprising:
    dividing the mobile stations into a first and a second data rate group;
    selecting a first mobile station for transmission, the first mobile station being the first one in a data queue and in the first data rate group;
    calculating first cross correlations between array response vectors of the first mobile station and the rest of the mobile stations in the first data rate group;
    comparing the first cross correlations to a predetermined threshold;
    selecting a second mobile station unless all the first cross correlations are greater than or equal to the predetermined threshold and all second cross correlations between array response vectors of the first mobile station and mobile stations in the second data rate group are greater than or equal to the predetermined threshold; and
    transmitting data from said selected mobile stations simultaneously.

2. The method of claim 1, wherein the second mobile station has an associated one of the first cross correlations that is the lowest of the first cross correlations if at least one of the first cross correlations is less than the predetermined threshold.

3. The method of claim 1, wherein the second mobile station has an associated one of the second cross correlations that is the lowest of the second cross correlations if there are no first cross correlations less than the predetermined threshold and if at least one of the second cross correlations is less than the predetermined threshold.

4. The method of claim 1, further comprising determining whether a third mobile station is selected, wherein the determining comprises:

calculating third cross correlations between array response vectors of the second mobile station and mobile stations in the second data rate group;

calculating fourth cross correlations between array response vectors of the first mobile station and mobile stations in the second data rate group;

determining if any mobile station in the second data rate group has associated therewith cross correlations with respect to the first mobile station and the second mobile station below the predetermined threshold;

summing the cross correlations with respect to the first mobile station and the second mobile station with any mobile station of the second data rate group determined to be below the predetermined threshold;

selecting as the third mobile station a mobile station having a smallest sum of cross correlations with respect to the first mobile station and the second mobile station.

5. The method of claim 1, further comprising determining whether a third mobile station is selected, wherein the determining comprises:

calculating third cross correlations between array response vectors of the second mobile station and mobile stations in the first data rate group that have cross correlations less than the predetermined threshold; and selecting the third mobile station if at least one of the first and at least one of the third cross correlations are less than the predetermined threshold, the third mobile station having an associated one of the third cross correlations that is the lowest of the third cross correlations.

6. The method of claim 1, further comprising determining whether a third mobile station is selected, wherein the determining comprises:

calculating third cross correlations between array response vectors of the second mobile station and mobile stations in the second data rate group that have cross correlations less than the predetermined threshold; and selecting the third mobile station if at least one of the second and at least one of the third cross correlations are less than the predetermined threshold, the third mobile station having an associated one of the third cross correlations that is the lowest of the third cross correlations.

7. A method of transmitting data from a plurality of mobile stations to a base station, the method comprising:

selecting a mobile station, the first mobile station being the first in a data queue;

calculating cross correlations of array response vectors of the mobile station and array response vectors of other selected mobile stations;

selecting one or more of the mobile stations based on mobile stations having cross correlations less than a predetermined threshold; and transmitting simultaneously the selected mobile stations during a next data packet duration.

8. The method of claim 7, wherein the transmission is the maximum instantaneous data rate of the selected mobile stations.

* * * * *

UNITED STATES PATENT AND TRADEMARK OFFICE
CERTIFICATE OF CORRECTION

PATENT NO. : 7,194,006 B2 Page 1 of 1
APPLICATION NO. : 09/874932
DATED : March 20, 2007
INVENTOR(S) : Piu B. Wong et al.

It is certified that error appears in the above-identified patent and that said Letters Patent is hereby corrected as shown below:

In the specification:

Colum 1, Line 42 delete "modem" and replace with --modern--.

Column 15, Equation 3, that portion of the equation reading "$| V(n3)' * V(n3) |^2$" should read --$| V(n1)' * V(n3) |^2$--.

Signed and Sealed this

First Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,194,006 B2  Page 1 of 1
APPLICATION NO. : 09/874932
DATED : March 20, 2007
INVENTOR(S) : Piu B. Wong et al.

It is certified that error appears in the above-identified patent and that said Letters Patent is hereby corrected as shown below:

Title Page please amend paragraph Item (60) on the cover page of the patent as follows:

Provisional application No. ~~60/237,951, filed on Oct. 3, 2000, provisional application No.~~ 60/218,905, filed on Jul. 18, 2000.

Signed and Sealed this

Thirty-first Day of March, 2009

JOHN DOLL
*Acting Director of the United States Patent and Trademark Office*